United States Patent Office 3,230,179
Patented Jan. 18, 1966

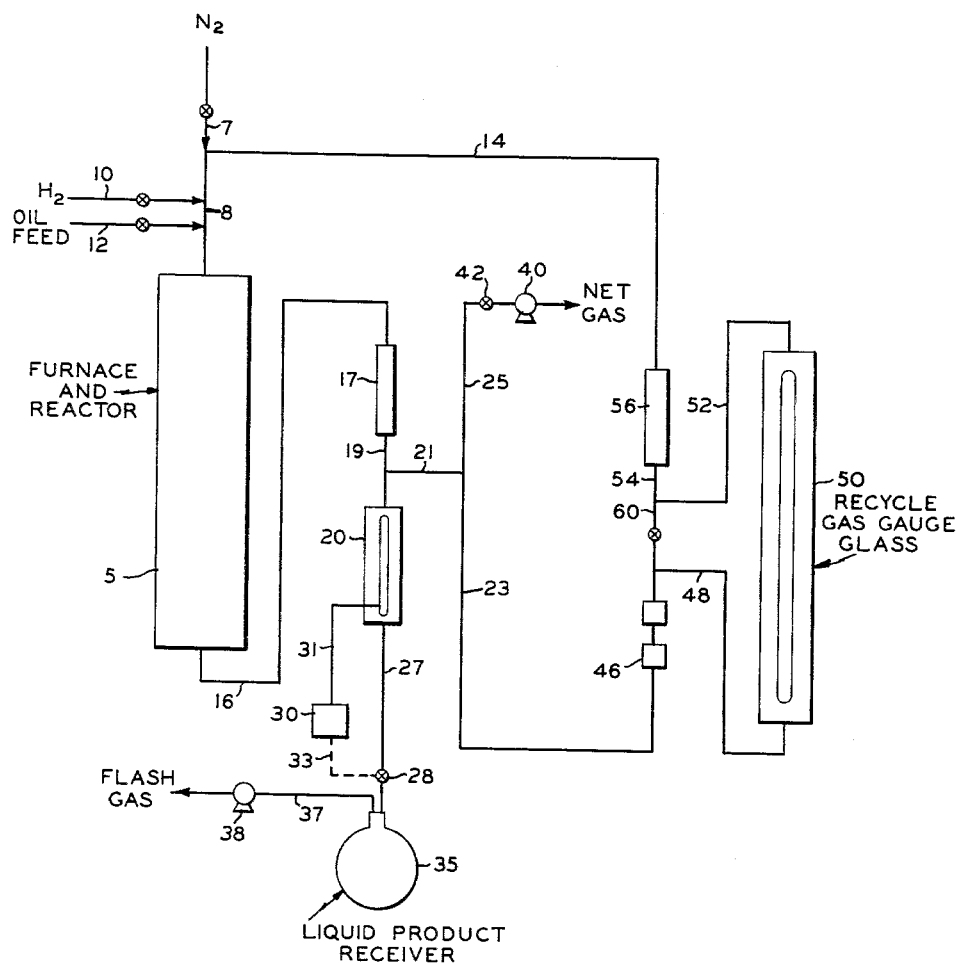

3,230,179
REGENERATION OF A PLATINUM CATALYST BY OXIDATION AND TREATMENT WITH A HYDROGEN CONTAINING GAS
Eugene F. Schwarzenbek, Short Hills, N.J., assignor to Pullman Incorporated, a corporation of Delaware
Filed Jan. 28, 1963, Ser. No. 254,828
6 Claims. (Cl. 252—416)

This application is a continuation-in-part of application Serial No. 497,043 filed March 28, 1955, now abandoned.

This invention relates to an improved method of pre-conditioning a platinum catalyst which has been previously regenerated with an oxygen containing gas, and more particularly, it pertains to a method of pre-reducing a regenerated platinum catalyst whereby the life of the catalyst is prolonged significantly.

It is the practice to pre-reduce a platinum catalyst which has been regenerated by means of an oxygen containing gas in order to eliminate from the catalyst any adsorbed oxygen or to convert any oxide of platinum to the metallic form. In either case, the elimination of oxygen results in the production of water, and platinum catalysts, in general, are sensitive to the presence of water at elevated temperatures. Further, it is known that as a result of regenerating the platinum catalyst there is a permanent loss of activity and, therefore, it is important to conduct the regeneration of catalyst under conditions resulting in a minimum loss of activity. Accordingly, it is the purpose of this invention to provide a method of regeneration whereby the life of the catalyst is prolonged significantly.

It is an object of this invention to provide an improved method of regenerating a platinum catalyst.

Another object of this invention is to provide an improved method for pre-reduction of platinum catalyst following the regeneration thereof for the removal of carbonaceous material.

Other objects and advantages of this invention will become apparent from the following description and explanation thereof.

By means of the present invention, it is proposed treating the platinum catalyst which was previously treated with an oxygen containing gas with a hydrogen containing gas in a zone maintained at a hydrogen partial pressure of about 0.05 to about 1.0 p.s.i.a., based on the inlet conditions, and at an elevated temperature.

The catalyst to be treated in accordance with the present invention is one which has been previously contacted with an oxygen containing gas thereby resulting in the absorption of oxygen and/or the conversion of a portion of the platinum to the oxide form. Accordingly, for the purpose of this specification and the appended claims, a "platinum catalyst containing oxygen" is one containing adsorbed and/or chemically combined oxygen. Usually, the treatment of the platinum catalyst with the oxygen containing gas takes place at a superatmospheric temperature in the order of about 400° to about 1200° F., more usually about 600° to about 1100° F. The present invention has particular application to a catalyst which has been previously used for chemical conversion, such as for the conversion of hydrocarbons and thereby it becomes contaminated with a combustible or carbonaceous deposit. In order to revive the catalyst, it is contacted with an oxygen containing gas at a temperature of at least about 500° F. and up to about 1150° F., more usually a temperature of about 500° to about 1050° F. As a result, the carbonaceous material is removed by combustion and the catalyst is then pre-reduced with hydrogen containing gas under the conditions of the present invention. In this respect, the hydrogen partial pressure which is maintained in the treating zone is kept at a low level of about 0.05 to about 1.0 p.s.i.a. The hydrogen partial pressure in the treating zone is based on inlet conditions. It is also desirable to maintain the temperature of pre-reduction at the lowest level possible such as, for example, at least about 400° F. and it can be as high as 950° F., although it is preferred that the temperature does not exceed about 850° F. For economic reasons, in commercial practice, it is desirable to use a temperature of 750° to 900° F. The period of treatment with the hydrogen containing gas is at least about 5 minutes and it can be as high as 5 hours, although usually the period of treatment will vary from about 15 minutes to about 1½ hours.

The platinum catalyst to be treated in acordance with this invention is any platinum catalyst which is supported or dispersed upon a suitable carrier material. The catalyst is prepared in a conventional manner, therefore, any person skilled in the art will readily understand the technique by which such catalysts are made. In general, the platinum catalyst may contain about 0.05 to about 20% or higher of platinum, based on the total weight of the catalyst. More usually, when the catalyst is empolyed for the conversion of hydrocarbons, it contains about 0.1 to about 2% by weight, based on the total catalyst. The carrier material for the catalyst can be any suitable material for this purpose and here again one skilled in the art will readily understand the type of carrier material to be employed. However, in general, the carrier material can be an inorganic metal oxide, such as alumina, silica, silica-alumina, magnesia, kieselguhr, pumice, zinc aluminate spinel, etc.

As previously indicated, the present invention is particularly applicable for the treatment of a platinum catalyst which has been used for the conversion of hydrocarbons. In this respect, the hydrocarbon conversion processes include, for example, hydroforming, dehydrogenation, isomerization, desulfurization, hydrogenation, hydrocyclization, etc. For these purposes, a suitable hydrocarbon reactant is contacted with a platinum catalyst at a temperature of about 400° to about 1100° F., more usually about 500° to about 1000° F., a weight space velocity of about 0.01 to about 40, and a pressure ranging from atmospheric pressure to about 2500 p.s.i.g. In some processes, it is desirable to employ hydrogen, and therefore, hydrogen can be added to the reaction zone at the rate of about 500 to about 20,000 standard cubic feet (measured at 60° F. and 760 mm. Hg.) per barrel of oil feed, abbreviated as "SCFB." The present invention will be used to a great extent for the treatment of a platinum catalyst which has been used for hydroforming naphtha fractions or light hydrocarbon oils. In this regard, the naphtha feed is contacted with the catalytic material at a temperature of about 750° to about 1050° F., a pressure of about 25 to about 1000 p.s.i.g., a weight space velocity of about 0.1 to about 15 and in the presence of added hydrogen in the amount of about 1000 to about 10,000 SCFB.

As a result of converting hydrocarbons, the catalyst becomes contaminated with carbonaceous material, therefore requiring the removal of the contaminants with an oxygen containing gas. The catalyst may contain about 1 to about 15% by weight of carbonaceous material, based on the total catalyst. For this purpose, it is preferred to regenerate the catalyst with an oxygen containing gas by first optionally contacting the same with a regeneration gas containing about 0.05 to about 2 mol percent of oxygen, at a pressure of about 1 atmosphere up to the reaction pressure, e.g., 2500 p.s.i.g., preferably 1 atmosphere to 50 or 400 p.s.i.g. and at a temperature of about 400° to about 700° F. and for a period of about 0.5 to about 10 hours. The initial treatment is particularly applicable when the catalyst contains adsorbed hydrogen. Following the first treatment, the catalyst is contacted with a regeneration gas containing the same concentration of oxygen or higher and the same pressure, however, the temperature is raised to a level of about 750° to about 950° F. and the remainder of the carbonaceous material is burned over a period of about 5 to about 40 hours. After the carbonaceous material has been removed from the catalyst, it may be desirable to contact the platinum catalyst with a regeneration gas containing oxygen to provide an oxygen partial pressure of about 5 to about 200 p.s.i.a. The severe treatment with oxygen is conducted at a temperature of about 900° to about 1150° F. and for a period of about 0.5 to about 15 hours. It should be understood that after the catalyst has been treated for the removal of carbonaceous material, the first or third stage of treatment or both, as described above, can be eliminated, then the catalyst can be treated in accordance with the present invention. In regard to the treatment of the catalyst with hydrogen containing gas, the manner of treatment can be varied such that the catalyst is contacted initially with hydrogen containing gas to provide a hydrogen partial pressure falling in the range of about 0.05 to about 5 p.s.i.a., at a temperature of about 400° to about 825° F. and for a period of about 10 minutes to about 2 hours, and then (a) the temperature of pre-reduction is increased by an increment in the range between about 50° and about 400° F., however, the upper limit of temperature should not exceed about 950° F. and (b) the hydrogen partial pressure can be increased to fall within the range of about 6 to 50 p.s.i.a., based on inlet conditions, and the remaining treatment is conducted for about 15 minutes to 3 hours.

In order to provide a better understanding of this invention, reference will be had to the accompanying drawing which contains an illustration of a test unit employed for the purpose of evaluating the pre-reduction treatment of this invention.

The reactor and furnace are combined in a single unit 5 which comprises a one-inch removable stainless steel pipe encased in bronze blocks and heated with electrical windings. The upper one-third of the reactor is occupied by the preheater, while the lower two-thirds is used to hold the catalyst charge. Temperatures in the reactor are monitored by means of suitable thermocouples and are controlled by means of the electrical windings.

Nitrogen is supplied to reactor 5 by means of a valved line 7, and thence it flows through inlet manifold 8 which is connected to the top thereof. Hydrogen is supplied to the manifold 8 by means of valved line 10. Similarly, oil feed is supplied to the manifold 8 by means of a valved line 12. Recycled hydrogen is supplied to the reactor 5 by means of a line 14, which in turn is connected to the inlet manifold 8.

The gaseous effluent from the reactor 5 is discharged from the bottom thereof by means of a line 16. This gaseous effluent is first allowed to pass through the top of condenser 17, and then it is discharged from the bottom thereof by means of a line 19, which is connected to the top of high pressure receiver 20. The normally gaseous product material is withdrawn from line 19 and it passes into a line 21 for further division into a recycle gas stream for passage through line 23 and the net yield of this product for flow through line 25. The liquid product in high pressure receiver 20 is discharged from the bottom thereof through line 27. A liquid level is maintained in high pressure receiver 20 by hand control of valve 28 in line 27. The liquid product flows into liquid product receiver 35 at atmospheric pressure. By virtue of the reduction in pressure from super-atmospheric pressure to atmospheric pressure across valve 28, gaseous product material is flashed therefrom, consequently, line 37 which is connected to the top of the product receiver 35 provides for the discharge of the flashed gaseous material. The quantity of flashed gaseous material is measured by means of meter 38 installed in line 37.

The net production of gaseous material from the reforming operation is yielded through line 25. The quantity of this gaseous product material is measured by means of a meter 40 installed in this line. Prior to being measured in meter 40, the gaseous product material is depressurized to essentially atmospheric pressure by means of a valve 42 installed in line 25.

The recycle gas stream flowing through line 23 is passed through a compressor 46 in which the pressure is raised sufficiently to overcome the pressure drop in the system. The compressed recycle gas stream flows from compressor 46 to line 48, and thence to a recycle gas gauge glass 50 when measurement of the rate is desired. Compressed gas is discharged from the top of gauge 50 by means of line 52 as the gas in line 48 displaces a liquid in the bottom of gauge 50, and thence it flows through line 54 which is connected to the bottom of dryer 56. The dryer contains granular material for the purpose of absorbing moisture from the recycle gas stream. The dried recycle gas stream is then discharged from the dryer through line 14, previously discussed. The recycle gauge glass is used only intermittently in operation of the unit, the normally compressed recycle gas stream by-passes this gauge and passes through a valved line 60 directly through line 54, which is in turn connected to the bottom of dryer 56.

The described equipment was used in four naphtha reforming runs. Each run included several cycles of reforming, regeneration and pre-reduction with hydrogen. Inspection data on the catalyst used in each of the four runs to be discussed below is set forth in Table I.

TABLE I

Inspections, volatile free basis, weight percent:

| | |
|---|---|
| $Al_2O_3$ | 98.24 |
| Cl | 0.66 |
| F | <0.01 |
| Fe | 0.014 |
| $Na_2O$ | 0.005 |
| Pt | 0.58 |
| S | 0.18 |
| $SiO_2$ | 0.09 |
| Ignition loss at 1500° F., weight percent | 2.82 |

The reactor 5 was charged with 1.73 grams of the catalyst and with Alundum to bring the volume of the bed to 250 cc.

The catalyst was reduced with hydrogen at 800° F. and then the unit was brought up to the temperature and pressure of the run. Recycle was begun and oil was cut in at the required rate. Time zero was when a liquid level was established in high pressure receiver 20. The reforming conditions were uniform throughout each cycle of each run, including a temperature of 950° F., a weight hourly space velocity of 44, a pressure of 200 p.s.i.g., and a mol ratio of recycle gas to mols of oil of 3.0. Each cycle on oil was of 16-hour length. Liquid product samples were taken in four equal intervals over the cycle length. Micro-octanes were run on the weathered liquid product of each period. At the end of the cycle, oil was cut out and unit was flushed with hydrogen and then nitrogen. The oil used in each cycle of each run was a naphtha having the inspections set forth in Table II.

TABLE II

| | |
|---|---|
| Gravity, ° API | 53.0 |
| ASTM Distillation: | |
|   IBP, ° F. | 252 |
|   5% | 266 |
|   10 | 272 |
|   20 | 278 |
|   30 | 284 |
|   40 | 290 |
|   50 | 298 |
|   60 | 306 |
|   70 | 314 |
|   80 | 323 |
|   90 | 336 |
|   95 | 347 |
|   E.P. | 380 |
| Vol. percent rec. | 99.0 |
| Vol. percent res. | 1.0 |
| Vol. percent loss | 0.0 |
| Aniline point, ° F. | 134 |
| Octane No., CFRR, clear | 39.0 |
| Paraffins, vol. percent | 51.0 |
| Naphthenes, vol. percent | 40.1 |
| Aromatics, vol. percent | 8.9 |
| Sulfur, wt. percent | 0.005 |
| Bromine No. | 1.83 |
| Watson K-factor | 11.93 |
| Molecular weight | 126 |
| Molal average boiling point, ° F. | 295 |

At the end of each 16-hour cycle on oil, the unit temperature was dropped to the initial burnout temperature with nitrogen flowing at atmospheric pressure. When the average of the catalyst temperatures reached the required initial burnout temperature, unit pressure was adjusted where necessary to the required pressure with nitrogen, and air and nitrogen were then introduced at the proper ratio to give the required volume percent oxygen at the initial burnout temperature. After the prescribed time at the initial burnout temperature, the unit temperature was increased to the regeneration temperature if required, at 25° F./hr., with the air-nitrogen stream flowing. After the required time at the initial oxygen content at the regeneration temperature, the volume percent oxygen was increased to that of full air in seven equal steps over a 70 minute period. If any catalyst temperature increased 15° F. above the stated regeneration temperature at any time, the air was cut out and the average catalyst temperature was permitted to drop to the regeneration temperature before the air was reintroduced and the regeneration was permitted to continue. After full air was reached, the temperature was increased, if required, and the pressure adjusted, if required, to the air soak temperature and pressure, and air was passed over the catalyst for the required length of time in the air soak. The volume throughput of the regeneration gases was kept substantially constant at about 10 s.c.f.h.

In Runs 1 and 2 which consisted of five and seven cycles respectively, the conditions used pursuant to the foregoing regeneration procedure following each cycle were atmospheric pressure, 0.5% (volume) oxygen at the initial burnout temperature of 700° F. for 15 minutes, temperature then raised to 800° F., then 0.5% (volume) oxygen at 800° F. for 90 minutes, then the oxygen content raised to full air (21% oxygen by volume) at 800° F. in 70 minutes, and finally full air at 800° F. for 2 hours. The water dew point of the regeneration gases averaged −10° F.

In Runs 3 and 4, the regenerations steps were carried out at 130 p.s.i.g. rather than atmospheric pressure. Also in these runs, the regeneration gases were first passed through a saturator (not shown) immersed in a constant temperature both at 100° F. such that the water dew point of the regeneration gases was about 100°F. The transfer line between the saturator and the reactor was maintained at about 150° F. to prevent condensation. In Runs 3 and 4, the regeneration temperature was kept at 800 ° F. throughout. The conditions of the regenerations which followed the first three cycles of Run 3 and all cycles of Run 4 were 0.5% (volume) oxygen for 90 minutes, then 0.5% (volume) oxygen to full air in 70 minutes, and finally full air for one hour. After the fourth cycle of Run 3, the regeneration conditions were 0.5% (volume) oxygen for three hours.

The procedure used in the pre-reduction of the catalyst is described below:

Run 1

When the air soak was complete, air was cut out, and nitrogen was passed over the catalyst while the temperature was adjusted to 850° F. A 100 percent hydrogen stream was passed over the catalyst for one hour while the temperature was maintained at 850° F. The total pressure and the hydrogen partial pressure during this treatment was 14.7 p.s.i.a.

Run 2

Following the air soak, the temperature was lowered to 500° F. in nitrogen. A stream containing 99.5% nitrogen and 0.5% hydrogen was then passed over the catalyst at 1–2 s.c.f.h. for ½ hour. During this initial pre-reduction, total pressure was 14.7 p.s.i.a. and the hydrogen partial pressure was about 0.07 p.i.s.a. After this, the temperature was increased to 850° F. at 75° F./hr. with a stream of the same composition. The, the catalyst was contacted at 850° F. and atmospheric pressure with 100% hydrogen for 1 hour.

Run 3

The pre-reduction was carried out at 130 p.s.i.g. The catalyst was first contacted with a gas containing 99.5% nitrogen and 0.5% hydrogen for 1 hour at a temperature of 800° F. and a rate of 1–2 s.c.f.h. The hydrogen partial pressure during this treatment was about 0.7 p.s.i.a. The foregoing gas mixture by-passed the saturator. Following this pre-reduction at a hydrogen partial pressure of about 0.7 p.s.i.a., the catalyst temperature was raised to 940° F. in 1 hour using 100% hydrogen at 130 p.s.i.g.

Run 4

The pre-reduction was carried out at 130 p.s.i.g. in two steps. The catalyst was first contacted for one hour at 800° F. with a stream containing 99.5% nitrogen and 0.5% hydrogen which had passed through the saturator. The hydrogen partial pressure during this treatment was about 0.7 p.s.i.a. Then the catalyst temperature was raised to 940° F. in a 100% hydrogen atmosphere, by-passing the saturator.

The results of Runs 1–4 inclusive are tabulated below in Table III which presents the initial and final octane ratings for the product from each cycle on oil.

TABLE III

| Run No. | Cycle No. | Product Octane, CFRR—Clear | | |
|---|---|---|---|---|
| | | Initial | Final | Decline, No./Hr. |
| 1 | 1 | 81.0 | 63.5 | 1.08 |
| | 2 | 74.6 | 56.9 | 1.10 |
| | 3 | 73.0 | 52.4 | 1.29 |
| | 4 | 69.0 | 52.1 | 1.05 |
| | 5 | 67.3 | 52.3 | 0.94 |
| 2 | 1 | 80.6 | 68.7 | 0.74 |
| | 2 | 77.7 | 62.5 | 0.95 |
| | 3 | 80.6 | 61.1 | 1.22 |
| | 4 | 81.2 | 64.8 | 1.02 |
| | 5 | 77.1 | 62.1 | 0.94 |
| | 6 | 79.1 | 63.3 | 0.99 |
| | 7 | 76.0 | 62.0 | 0.87 |
| 3 | 1 | 72.3 | 62.0 | 0.64 |
| | 2 | 71.8 | 60.0 | 0.74 |
| | 3 | 71.8 | 53.5 | 1.15 |
| | 4 | | | |
| | 5 | 71.8 | 56.5 | 0.96 |
| 4 | 1 | 72.5 | 62.0 | 0.66 |
| | 2 | 72.0 | 58.4 | 0.85 |
| | 3 | 70.0 | 56.6 | 0.84 |
| | 4 | 69.0 | 55.1 | 0.87 |
| | 5 | 69.6 | 55.2 | 0.90 |

The data were analyzed by two methods, each based on the variation of the octane rate constant, $k$, with time. The octane rate constant is based on the temperature, space velocity, recycle rate and octane level. It is a reliable index of the relative activity level of the catalyst.

The loss of initial catalyst activity with repeated regenerations is one important criterion in assessing a regeneration technique. A plot of the octane rate constant against time gives a saw-tooth shape curve with a vertical line at the time corresponding to each regeneration. The peaks of the teeth are progressively lower with time. A straight line is established by the peaks which can be regarded as a loss of activity line. The slope of that line which is expressed mathematically as $-d \ln\, k_o/d$ No. of regenerations provides an indication of the relative loss of initial catalyst activity with repeated regenerations. The values of this indicator for each run are set forth in Table IV below.

The loss of activity within each cycle, as well as the loss of initial activity, is important in comparing regeneration techniques. The following method was used to combine these two factors into one factor, termed the deactivation factor, or D-factor. D may be defined as the length of cycle "$n$" divided by the length of cycle ($n-1$) at a given terminal activity level. For purpose of this analysis, the average ratio of the cycle lengths at 0.4 of the extrapolated initial activity at time 0 was termed the D-factor. Values for the D-factor so calculated are also set forth in Table IV below for each run.

TABLE IV

| Run No. | Regeneration | | Pre-reduction | | $-d \ln\, k_o$ $d$ No. of Regen. | D-factor |
|---|---|---|---|---|---|---|
| | Pressure, p.s.i.g. | Saturator, °F. | $H_2$ Part. Pr., p.s.i.a. | Saturator, °F. | | |
| 1 | 0 | Out | 14.7 | Out | 0.159 | 0.72 |
| 2 | 0 | Out | 0.07 | Out | 0.016 | 0.98 |
| 3 | 130 | 100 | 0.7 | Out | 0.023 | 0.91 |
| 4 | 130 | 100 | 0.7 | 100 | 0.023 | 0.91 |

The above runs were all made on the same catalyst batch, with the same feed stock, and substantially the identical regeneration technique, the partial pressure of hydrogen in the pre-reduction step being the prime variable. The data clearly show the marked improvement in regeneration efficiency and catalyst life obtainable by operation in accordance with the process of the invention. In Run 1, conditions of pre-reduction correspond to those of the prior art. In Run 2, with a low hydrogen partial pressure of 0.07 p.s.i.a., the rate of loss of initial activity of the catalyst with repeated regenerations is only about one tenth of that of Run 1 and the D-factor is about one third higher than that of Run 1. The use of saturated regeneration gases is known to be detrimental to regeneration efficiency. Yet Runs 3 and 4 show that excellent regeneration efficiency is attainable notwithstanding saturated regeneration gases provided that a low hydrogen partial pressure, specifically about 0.7 p.s.i.a., is used in pre-reducing the regenerated catalyst.

Although no certain explanation can be given for the marked improvement in regeneration efficiency and catalyst life which results from the practice of the invention, it is suggested that the temperature on the surface of an oxidized catalyst increases very rapidly when initially contacted with a full atmosphere of hydrogen. If very low hydrogen partial pressures and/or low hydrogen concentrations are used in the treating gas, the rate of reduction is decreased, and the instantaneous surface temperature is lower, and has no detrimental effect on the activity and stability of the heat-sensitive platinum catalyst. The fact that the saturation of the pre-reduction gas in Run 4 has no effect on the regeneration efficiency suggests that water partial pressure during pre-reduction may be of little or no effect. It should be understood, however, that the invention is not to be restricted in any way by any theory of its mechanism.

What is claimed is:

1. A process which comprises contacting a platinum catalyst containing oxygen with a free hydrogen containing gas in a zone maintained at a hydrogen partial pressure of about 0.05 to 1.0 p.s.i.a. and at an elevated temperature of at least about 400° F.

2. A process which comprises regenerating a platinum catalyst contaminated with carbonaceous material by contact with a free oxygen containing gas for the removal by combustion of the carbonaceous material and then contacting the regenerated catalyst with a free hydrogen containing gas in a zone maintained at a hydrogen partial pressure of about 0.05 to 1.0 p.s.i.a. and at a temperature of about 400° to 950° F.

3. A process which comprises contacting a platinum catalyst containing oxygen with a free hydrogen containing gas in a zone maintained at a hydrogen partial pressure of about 0.05 to about 1.0 p.s.i.a., a temperature of about 400° to about 95° F., and for a period of about 5 minutes to about 5 hours.

4. A process which comprises regenerating a platinum catalyst contaminated with carbonaceous material by first contacting the same with a regeneration gas containing 0.05 to 2 mol percent free oxygen, at a pressure of about 1 atmosphere to 50 p.s.i.g., a temperature of about 400° to 700° F. and for a period of about 0.5 to 10 hours; and then contacting the catalyst with a regeneration gas containing 0.05 to 2 mol percent free oxygen at a temperature of about 750° to about 950° F., and for a period of about 5 to 40 hours; and then contacting the regenerated catalyst with a free hydrogen containing gas in a zone maintained at a hydrogen partial pressure of about 0.05 to 1.0 p.s.i.a. at an elevated temperature of at least about 400° F.

5. The process of claim 4 which is further characterized in that the contact with the free hydrogen containing gas is conducted at a temperature of about 400° to about 950° F. and for a period of about 5 minutes to 5 hours.

6. A process which comprises regenerating a platinum catalyst contaminated with carbonaceous material by contact with a regeneration gas containing 0.05 to 2 mol percent free oxygen, at a temperature of about 750° to 950° F. and for a period of about 5 to 40 hours; and then contacting the regenerated catalyst with a free hydrogen containing gas in a zone maintained at a hydrogen partial pressure of about 0.05 to 1.0 p.s.i.a., at a temperature of about 400° to about 950° F., and for a period of about 5 minutes to about 5 hours.

References Cited by the Examiner

UNITED STATES PATENTS

| 2,606,878 | 8/1952 | Haensel | 252—416 |
| 2,752,288 | 6/1956 | Voorhies et al. | 252—411 |
| 2,762,752 | 9/1956 | Hemminger | 252—419 |

MAURICE A. BRINDISI, *Primary Examiner.*

UNITED STATES PATENT OFFICE
CERTIFICATE OF CORRECTION

Patent No. 3,230,179            January 18, 1966

Eugene F. Schwarzenbek

It is hereby certified that error appears in the above numbered patent requiring correction and that the said Letters Patent should read as corrected below.

Column 2, lines 43 and 44, for "hydrocyclization" read -- dehydrocyclization --; column 4, line 65, for "950° F." read -- 940° F. --; column 6, line 26, for "0.07 p.i.s.a." read -- 0.07 p.s.i.a. --; line 28, for "The," read -- Then, --; column 8, line 23, for "95° F." read -- 950° F. --.

Signed and sealed this 20th day of December 1966.

(SEAL)
Attest:

ERNEST W. SWIDER
Attesting Officer

EDWARD J. BRENNER
Commissioner of Patents